US012270480B2

(12) United States Patent
Gass (10) Patent No.: US 12,270,480 B2
(45) Date of Patent: Apr. 8, 2025

(54) WATER FLOW REGULATION (71) Applicant: Active Energy Inc., Burlington (CA)

(72) Inventor: Charles Gass, Davison, MI (US)

(73) Assignee: Active Energy Inc., Ontario (CA)

( * ) Notice: Subject to any disclaimer, the term of this patent is extended or adjusted under 35 U.S.C. 154(b) by 0 days.

(21) Appl. No.: 18/062,707

(22) Filed: Dec. 7, 2022

(65) Prior Publication Data

US 2023/0175594 A1 Jun. 8, 2023

Related U.S. Application Data (60) Provisional application No. 63/286,685, filed on Dec. 7, 2021.

(51) Int. Cl.
*F16K 17/06* (2006.01)
*F16K 15/02* (2006.01)
*F16K 15/06* (2006.01)

(52) U.S. Cl.
CPC ............ *F16K 17/06* (2013.01); *F16K 15/026* (2013.01); *F16K 15/063* (2013.01); *F16K 2200/30* (2021.08); *F16K 2200/304* (2021.08)

(58) Field of Classification Search
CPC .... F16K 15/025; F16K 15/026; F16K 15/063; F16K 17/06; F16K 2200/30; F16K 2200/304
See application file for complete search history.

(56) References Cited

U.S. PATENT DOCUMENTS

| 1,703,248 | A | * | 2/1929 | Rothenbucher | F16K 15/063 137/543.13 |
| 2,619,115 | A | * | 11/1952 | Dondero | F16K 17/04 137/543 |
| 2,725,076 | A | * | 11/1955 | Hansen | F16K 15/063 137/107 |
| 4,335,744 | A | * | 6/1982 | Bey | F16K 47/08 251/86 |
| 4,718,450 | A | * | 1/1988 | Ezekoye | F16K 47/08 137/538 |
| 9,939,072 | B2 | * | 4/2018 | Wyatt | F16K 17/0433 |
| 10,125,881 | B2 | * | 11/2018 | Choate | F16K 17/0413 |

* cited by examiner

*Primary Examiner* — Kevin F Murphy
(74) *Attorney, Agent, or Firm* — Carlson, Gaskey & Olds, P.C.

(57) ABSTRACT

A flow regulation valve includes a housing having a valve seat within the housing. A poppet valve disposed in the housing includes a crown and a spring that biases the crown into engagement with the valve seat. An abutment surface is situated to engage an end of the spring distal from the crown. An adjustor that is accessible from outside the housing selectively sets a tension on the spring by moving the abutment surface relative to the crown.

21 Claims, 6 Drawing Sheets

WATER FLOW REGULATION

CROSS REFERENCE TO RELATED APPLICATION

This application claims priority to U.S. Provisional Application No. 63/286,685, filed on Dec. 7, 2021.

BACKGROUND

Water flow meters measure water flow to residential and commercial properties. In general, water flow meters measure the volume of fluid that flows through the meter. In some cases, the water flowing through the flow meter causes a turbine to spin. A sensor counts the number of rotations of the turbine. The water volume through the flow meter can be estimated from the number of rotations of the turbine counted by the sensor. Because owners of residential and commercial properties are billed for the amount of water they use, the water flow measured by the water flow meter can be used to calculate a water bill.

Water flow meters can be inaccurate. Water flow meters measure all fluid flow, including air. Turbulent water flow can introduce large pockets of air into the water flow meter. Large pockets of air may be detected as water, resulting in property owners being charged for more water than they actually used.

SUMMARY

An illustrative example embodiment of a flow regulation valve includes a housing having a valve seat within the housing. A poppet valve disposed in the housing includes a crown and a spring that biases the crown into engagement with the valve seat. An abutment surface is situated to engage an end of the spring distal from the crown. An adjustor that is accessible from outside the housing selectively sets a tension on the spring by moving the abutment surface relative to the crown.

Various features and advantages of at least one disclosed example embodiment will become apparent from the following detailed description. The drawings that accompany the detailed description can be briefly described as follows.

DETAILED DESCRIPTION

A flow regulation valve designed according to an embodiment of this invention can be used to reduce the turbulence of fluid flow into a flow meter. Reducing the turbulence reduces the size of any air pockets or bubbles within the fluid entering the flow meter. With smaller air pockets, the volume measured by the flow meter is a much more accurate representation of the amount of liquid passing through the meter. For discussion purposes, the following description will refer to water and air as an example fluid flowing through the disclosed example valves. The example valves may be used with other fluids.

An example flow regulation valve includes a poppet valve within a housing. The poppet valve includes a crown and a shaft. A collar disposed in the housing defines an opening. A wedge block is disposed in the opening of the collar.

During use, the poppet valve oscillates to break up air pockets in the water flow, which reduces the turbulence of the water entering the internal chamber. The oscillations can be adjusted by moving the wedge block further into or out of the opening of the collar. That is, the rod may be threaded so it can be screwed further into or out of the collar. When screwed further into the collar (e.g., clockwise), the rounded tip of the rod engages the channel of the wedge block, which pushes the wedge block out of the opening of the collar, increasing the tension on the spring. Increased tension means that higher water pressure is required to cause the poppet valve to oscillate. When the rod is screwed in a direction that causes it to retract from the collar (e.g., counterclockwise), the wedge block slides deeper into the opening defined by the collar, lowering the tension on the spring. Lowering the tension on the spring means that lower water pressure will allow the poppet valve to oscillate. Accordingly, the flow regulation valve can be adjusted without having to disconnect or remove the flow regulation valve from the piping leading to the water flow meter.

The elements shown may take many different forms and include multiple and/or alternate components and facilities. The example components illustrated are not intended to be limiting. Indeed, additional or alternative components and/or implementations may be used.

Figure 1:
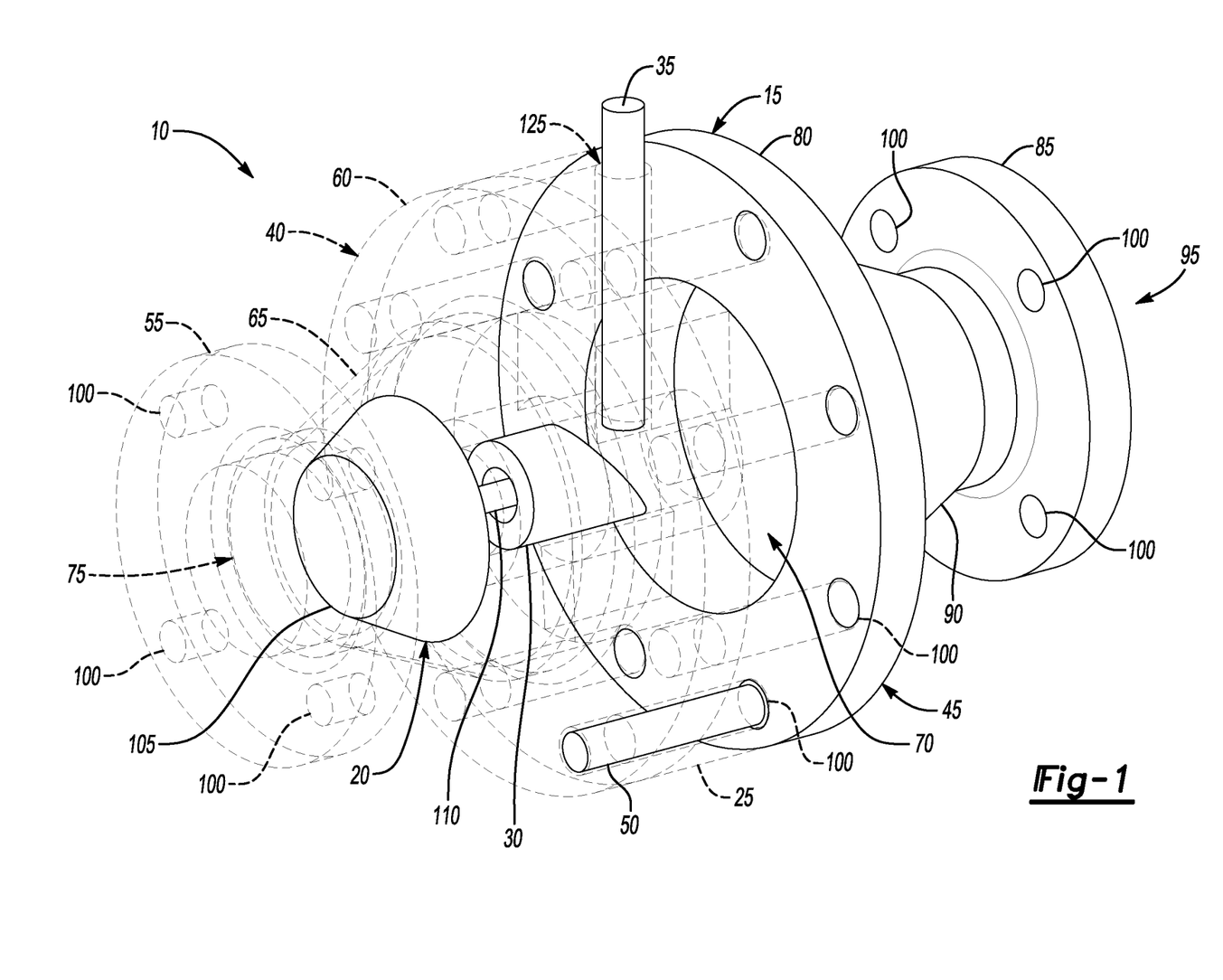
FIG. 1 illustrates an example flow regulation valve that reduces fluid turbulence.

FIG. 1 illustrates an example flow regulation valve 10 that reduces fluid turbulence. The flow regulation valve 10 may be installed on the inlet side of a water meter (not illustrated) so that water flow to the water meter is accurately measured, which can reduce overbilling. A flow regulation valve 10 may also be installed on the municipality side of the meter to more accurately track water flow and potentially recover lost revenue.

As illustrated in FIG. 1, the flow regulation valve 10 includes a housing 15, a poppet valve 20, a collar 25, a wedge block 30, and a rod 35.

The housing 15 is formed from two pieces, a first piece 40 and a second piece 45, joined by pins 50 or other types of fasteners. The housing 15 may be metal or plastic. The first piece 40 may include a first flange 55, a second flange 60, and a first connector body 65. The first flange 55, the second flange 60, and the first connector body 65 may be integrally formed so that the first piece 40 is a single unit. As shown, the first flange 55 may have a smaller diameter than the second flange 60. Moreover, the first connector body 65 may have a frustoconical configuration at least partially defining an internal chamber 70 of the flow regulation valve 10. The first piece 40 defines a fluid inlet 75 that allows, e.g., water to flow through the first flange 55, the first connector body 65, and the second flange 60 into the internal chamber 70 of the housing 15.

The second piece 45 may include the same or a similar structure as the first piece 40. That is, the second piece 45 may include a third flange 80, a fourth flange 85, and a second connector body 90. The third flange 80, the fourth flange 85, and the second connector body 90 may be integrally formed with one another so that the second piece 45 is a single unit. As shown, the fourth flange 85 may have a smaller diameter than the third flange 80. Moreover, the second connector body 90 may have a frustoconical configuration at least partially defining the internal chamber 70 of the flow regulation valve 10. The second piece 45 defines a fluid outlet 95 that allows, e.g., water to flow through the third flange 80, the second connector body 90, and the fourth flange 85. The water may flow from the fluid outlet 95 to, e.g., the water flow meter.

The second flange 60 and the third flange 80 may define holes 100 for receiving the pins 50 or other types of fasteners. Therefore, the housing 15 may be assembled by aligning the holes 100 of the second flange 60 of the first piece 40 with the holes 100 of the third flange 80 of the second piece 45 and inserting the pins 50 into the holes 100 with the collar 25 and its corresponding holes 100 disposed between the first piece 40 and the second piece 45. The first flange 55 and the fourth flange 85 may also define holes 100 that can be used to attach the flow regulation valve 10 to a water flow meter or other components. That is, pins 50 or another type of fastener can be inserted into the holes 100 to connect the flow regulation valve 10 to the water flow meter, pipes, valves, etc.

The poppet valve 20 is disposed in the housing 15, particularly in the internal chamber 70, and includes a crown 105 and a shaft 110. The crown 105 has a frustoconical configuration that extends into the first connector body 65 of the first piece 40 of the housing 15. The poppet valve 20 is in the closed position when the crown 105 is seated against an inside surface of the first flange 55. When in the closed position, the crown 105 prevents fluid flow into the fluid inlet 75 defined by the first piece 40 of the housing 15. The poppet valve 20 may be in an open position when the crown 105 and shaft 110 are pushed into the internal chamber 70 of the housing 15, as discussed in greater detail below. Water may flow into the fluid inlet 75 when the poppet valve 20 is in the open position. A spring 115 disposed on the shaft 110 biases the poppet valve 20 toward the closed position.

The poppet valve 20 oscillates when water of a certain pressure is provided to the fluid inlet 75. That is, increased water pressure overcomes the tension on the spring 115, which pushes the crown 105 and shaft 110 into the internal chamber 70 and allows water to enter the flow regulation valve 10 via the fluid inlet 75. The tension of the spring 115, however, increases as the spring 115 is compressed. When the spring 115 is compressed a certain amount, the tension on the spring 115 overcomes the water pressure, pushing the poppet valve 20 back toward the fluid inlet 75. After the poppet valve 20 is seated again, the spring 115 is extended and the tension on the spring 115 is at its lowest for a given configuration. Eventually, the water pressure becomes sufficient to overcome the tension on the extended spring 115 and drive the crown 105 and shaft 110 toward the internal chamber 70. As the crown 105 moves, the spring 115 is compressed, which increases the tension on the spring 115. This cycle repeats so long as the water pressure at the fluid inlet 75 is sufficient to push the crown 105 and shaft 110 toward the internal chamber 70 but not high enough to overcome the tension of the spring 115 when fully compressed.

The collar 25 is formed from metal or plastic and may be disposed between the first piece 40 and the second piece 45 of the housing 15. The collar 25 has a generally cylindrical shape with holes 100 for receiving the pins 50 that hold the first piece 40 and second piece 45 together. The collar 25 further includes an opening 150 (see FIGS. 3A-3B and 4A-4B) for receiving the poppet valve 20, particularly the wedge block 30. The collar 25 keeps the poppet valve 20 generally centered relative to the housing 15 as the poppet valve 20 oscillates. In some instances, gaskets 120 are disposed between the collar 25 and the first piece 40 and the second piece 45 of the housing 15.

In some possible implementations, an outer surface of the collar 25 defines an aperture 125 for receiving the rod 35, discussed in greater detail below. The aperture 125 may receive the rod 35 in a direction perpendicular to the direction of the poppet valve 20 disposed in the housing 15 and/or the wedge block 30 disposed in the opening 150 of the collar 25. That is, the poppet valve 20 (particularly the crown 105 and/or shaft 110 of the poppet valve 20) and the wedge block 30 may extend in a first direction in the housing 15 while the aperture 125 may permit the rod 35 to extend in a second direction that is perpendicular to the first direction. The collar 25 may further define one or more passages 130 to allow water to flow from the fluid inlet 75 into the internal chamber 70 and from the internal chamber 70 to the fluid outlet 95. The passages 130 may permit fluid flow in the first direction (e.g., the same direction as the direction of the poppet valve 20 inside the housing 15).

The wedge block 30 is formed from a metal or plastic material and disposed on the shaft 110 of the poppet valve 20 opposite the crown 105. The wedge block 30 may be disposed inside the opening 150 of the collar 25. At least a portion of the wedge block 30 may have a cylindrical, rectangular, or square configuration depending on the configuration of the opening 150 in the collar 25 (see FIGS. 3A-3B and 4A-4B). The opening 150 of the collar 25 may keep the wedge block 30 axially centered relative to the internal chamber 70 of the housing 15. In some instances, the opening 150 of the collar 25, alone or in combination with the rod 35, may keep the wedge block 30 from rotating. As discussed in greater detail below with respect to FIG. 2, inserting the rod 35 into the aperture 125 of the collar 25 pushes the wedge block 30 toward the poppet valve 20, partially increasing the tension on the spring 115. With the increased tension, higher water pressure is needed to cause the poppet valve 20 to oscillate. Retracting the rod 35 from the aperture 125 of the collar 25 partially reduces the tension on the spring 115, meaning the poppet valve 20 with oscillate at a lower water pressure. In other words, the rod 35 alters or adjusts a position of the wedge block 30 within the housing 15 to adjust the tension on the spring 115 when the spring 115 is in the extended position corresponding to the poppet valve 20 closing off the valve 10.

The rod 35 is formed from a metal or plastic material. The rod 35 is disposed in the aperture 125 of the collar 25 and extends into the opening 150 in a direction perpendicular to that of the wedge block 30. As discussed above, the wedge block 30 is inserted into the opening 150 in the first direction and the rod 35 is inserted into the opening 150 in a second direction perpendicular to the first direction. The rod 35 may include a tip that is rounded, and the rounded tip may engage the wedge block 30 to, e.g., push the wedge block 30 out of the opening 150 of the collar 25 or allow the wedge block 30 to enter the opening 150 of the collar 25.

Figure 2:
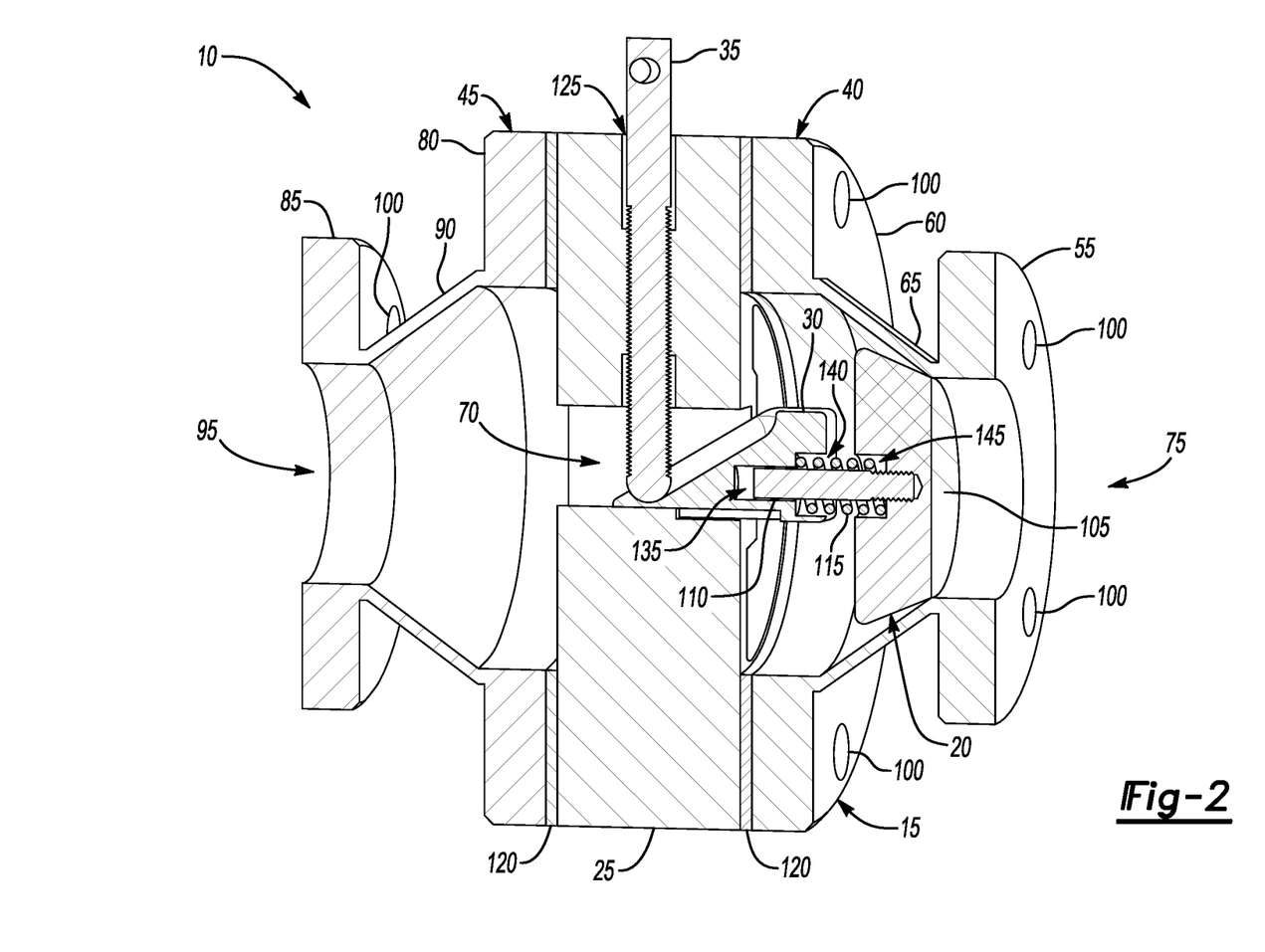
FIG. 2 is a cross-sectional view of the flow regulation valve of FIG. 1.

FIG. 2 is a cross-sectional view of the flow regulation valve 10 of FIG. 1. As shown in FIG. 2, the wedge block 30 defines a first orifice 135 for receiving the shaft 110 of the poppet valve 20. The wedge block 30 further defines a second orifice 140 axially aligned with the first orifice 135. The second orifice 140 has a greater diameter than that of the first orifice 135. The spring 115 may be disposed on the shaft 110 of the poppet valve 20 in the second orifice 140. The crown 105 may define a third orifice 145, which may have the same diameter as the second orifice 140. The spring 115 may further sit in the third orifice 145 so the spring 115 may engage both the poppet valve 20 and the wedge block 30. The wedge block 30 establishes an abutment surface that is received against one end of the spring 115.

The wedge block 30 may further define a channel for receiving the tip of the rod 35. As shown in FIG. 2, the tip of the rod 35 engages the channel. As the rod 35 is inserted deeper into the opening 150 (see FIGS. 3A-3B and 4A-4B) of the collar 25, the tip, sliding along the channel, forces the wedge block 30 toward the crown 105 of the poppet valve 20 and tensions the spring 115. As the rod 35 is retracted from the opening 150 of the collar 25, the spring 115 pushes the wedge block 30 deeper into the opening 150 of the collar 25.

The rod 35 and aperture 125 of the collar 25 shown in FIG. 2 are threaded. Therefore, the rod 35 may be screwed into or out of the aperture 125. That is, rotating the rod 35 clockwise may cause the rod 35 to extend deeper into the opening 150 of the collar 25. Rotating the rod 35 counterclockwise may cause the rod 35 to retract from the opening 150 of the collar 25. Further, the rod 35 may include a shoulder to prevent the rod 35 from being advanced too far into the aperture 125, as well as a positive stop near the middle of the rod 35 to prevent the rod 35 from being inserted too far into the aperture 125 and/or completely removed from the aperture 125.

In some embodiments, the shaft 110 of the poppet valve 20 may be threaded. The interior of the crown 105 may include corresponding threads for receiving the shaft 110 of the poppet valve 20. With the threads, the shaft 110 can be attached to the crown 105 and will remain attached during the oscillations of the poppet valve 20.

In some instances, the flow regulation valve 10 may be used as a backflow preventer. If the water pressure at the fluid outlet 95 becomes greater than the water pressure at the fluid inlet 75, water may enter the housing 15 through the fluid outlet 95. When water enters the internal chamber 70, the force of the water, along with the tension on the spring 115, will push the crown 105 of the poppet valve 20 toward the fluid inlet 75 until the crown 105 is seated against the first flange 55. When the crown 105 is seated against the first flange 55, the crown 105 will block the fluid inlet 75, preventing water to flow out of the flow regulation valve 10 via the fluid inlet 75. In some implementations, another chamber may be added to the housing 15 to further permit operation of the flow regulation valve 10 as a backflow preventer.

Figure 3A:
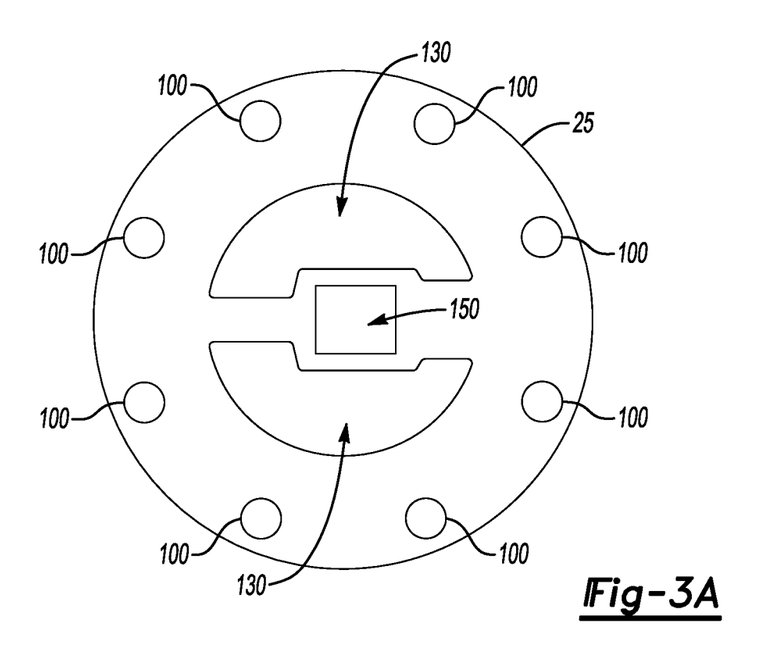
FIGS. 3A-3B are front and perspective views, respectively, of a first collar that may be incorporated into the flow regulation valve.
Figure 3B:
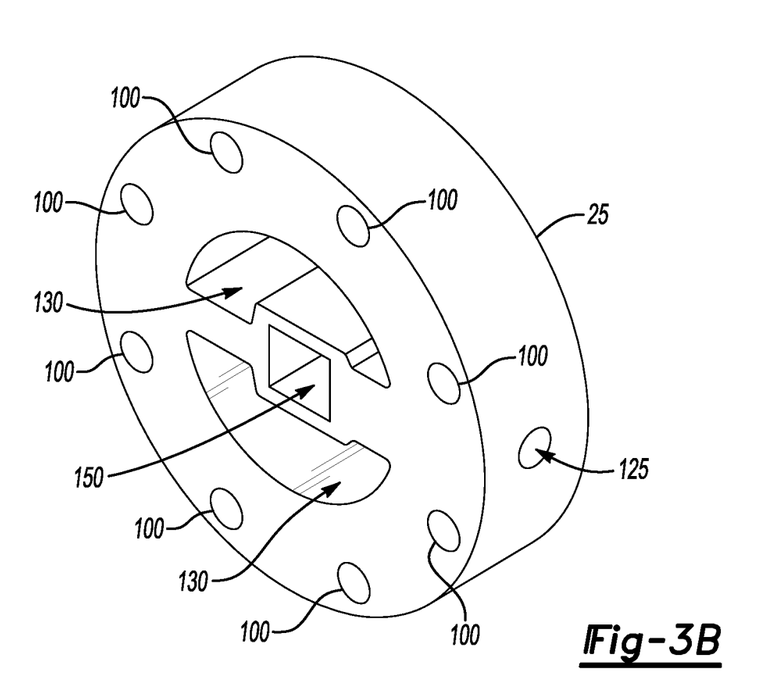

FIGS. 3A-3B are front and perspective views, respectively, of a first collar 25A that may be incorporated into the flow regulation valve 10. Specifically, the first collar 25A may be disposed between the first piece 40 and the second piece 45 of the housing 15. As shown, the opening 150 has a generally rectangular configuration, particularly a square configuration, for receiving the wedge block 30. The first collar 25A may be used in instances where the wedge block 30 at least partially has a corresponding rectangular or square configuration.

As shown in FIG. 3B, the aperture 125 is disposed on the exterior surface of the first collar 25A and extends in a direction perpendicular to that of the opening 150. With this configuration, the rod 35 can engage the wedge block 30 to, e.g., increase or decrease the tension on the spring 115. Therefore, the tension on the spring 115 can be adjusted to account for different water pressures without having to remove or disassemble the flow regulation valve 10.

Figure 4A:
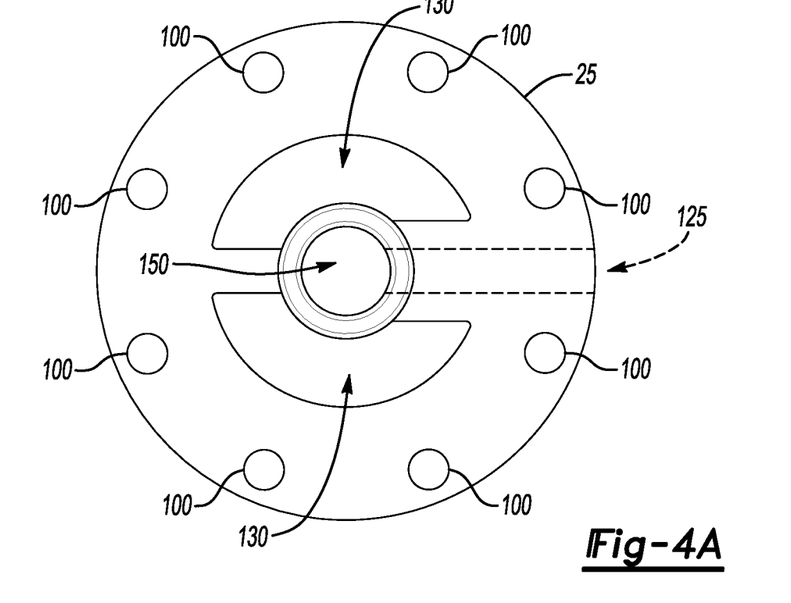
FIGS. 4A-4B are front and perspective views, respectively, of a second collar that may be incorporated into the flow regulation valve.
Figure 4B:
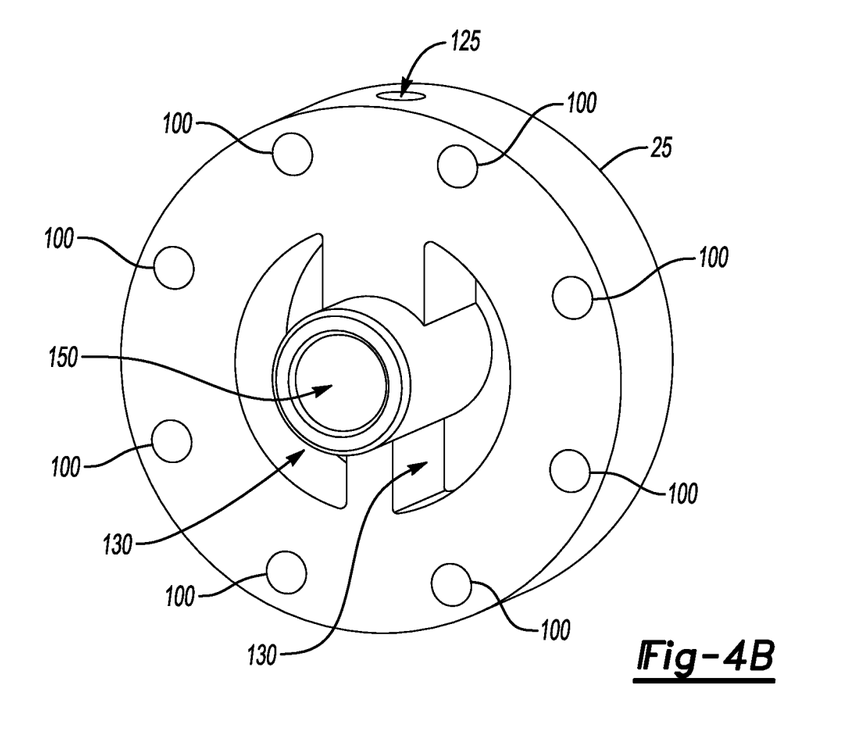

FIGS. 4A-4B are front and perspective views, respectively, of a second collar 25B that may be incorporated into the flow regulation valve 10. Specifically, the second collar 25B may be disposed between the first piece 40 and the second piece 45 of the housing 15. As shown, the opening 150 has a generally circular configuration for receiving the wedge block 30. The second collar 25B may be used in instances where the wedge block 30 at least partially has a corresponding cylindrical configuration.

As shown in FIGS. 4A and 4B, the aperture 125 is disposed on the exterior surface of the second collar 25B and extends in a direction perpendicular to that of the opening 150. With this configuration, the rod 35 can engage the wedge block 30 to, e.g., increase or decrease the tension on the spring 115. Therefore, the tension on the spring 115 can be adjusted to account for different water pressures without having to remove or disassemble the flow regulation valve 10.

Figure 5:
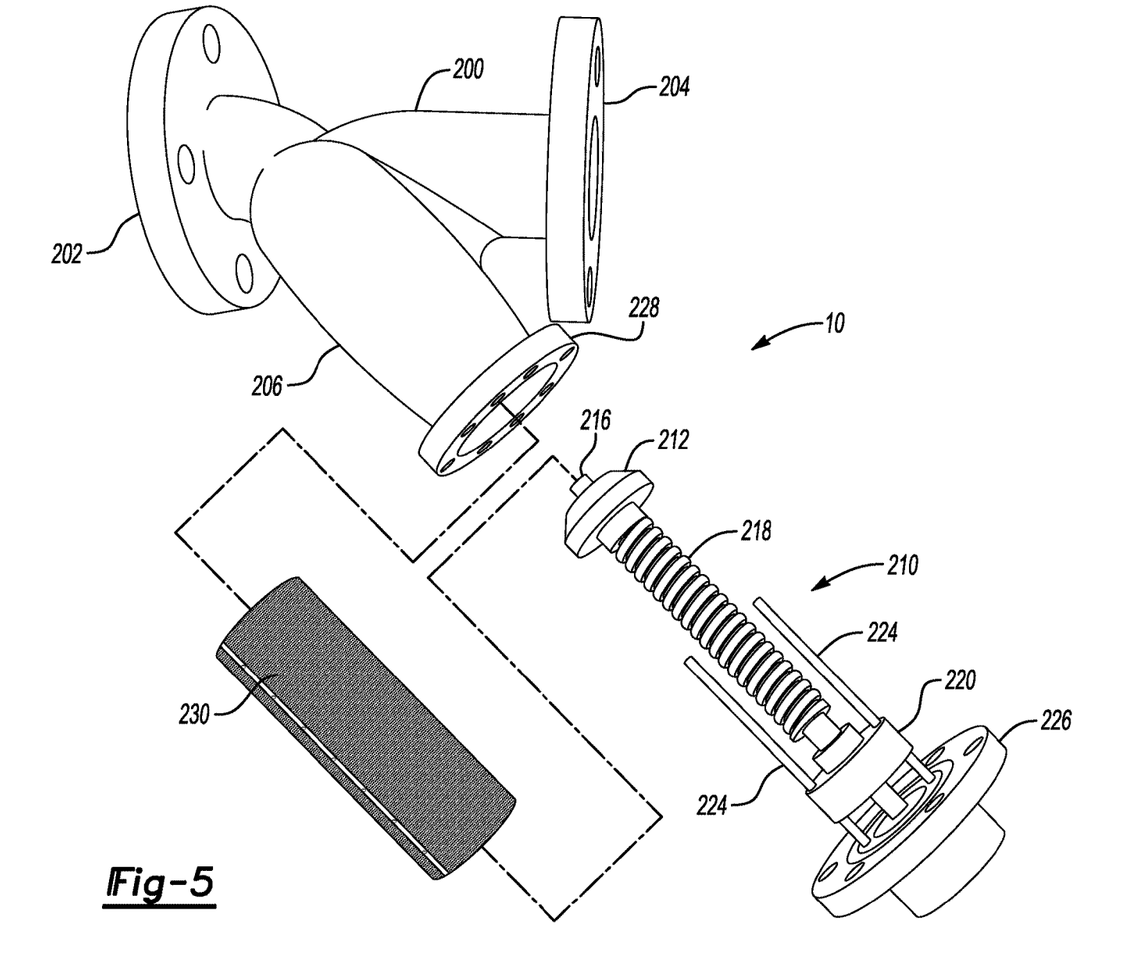
FIG. 5 is a partially exploded view of another example configuration of a flow regulation valve.
Figure 6:
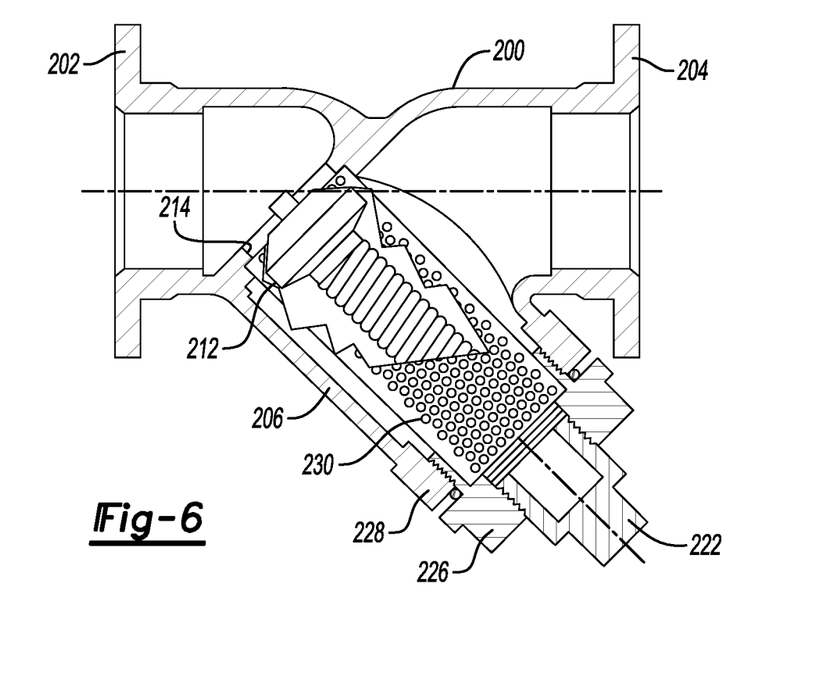
FIG. 6 is a cross-sectional illustration of selected features of the embodiment shown in FIG. 5.

FIGS. 5 and 6 show another example embodiment of a flow regulation valve 10. This embodiment includes a housing 200 that is configured to be situated in line with flow of a fluid of interest, such as water flowing through a water supply conduit. The housing 200 includes a connector flange 202 at an inlet side and another connector flange 204 at an outlet side of the housing. Fluid flows through the housing from left to right according to the drawing.

A branch 206 of the housing 200 is configured to receive a flow regulator 210. A poppet valve member 212 is configured to engage a valve seat 214 in the housing 200. When the poppet valve member 212 is seated against the valve seat 214, the poppet valve member 212 prevents fluid flow through the housing 200. The poppet valve member 212 is received on and slidable along a shaft or rod 216. A spring 218 biases the poppet valve member 212 into engagement with the valve seat 214. Fluid pressure from the inlet side of the housing 200 that is sufficiently high overcomes the bias of the spring 218 and forces the poppet valve member 212 away from the valve seat 214 and the fluid flows through the housing between the inlet and the outlet.

The bias force exerted by the spring 218 increases as the spring 218 is compressed by the fluid pressure acting on the poppet valve member 212. Once the spring force increases to a level that exceeds the pressure of the fluid, the spring 218 urges the poppet valve member 212 back into engagement with the valve seat 214. The fluid pressure then acts to move the poppet valve member 212 away from the valve seat. The repeated or cyclical application of opposing forces on the poppet valve member 212 by the fluid and the spring 218, respectively, causes reciprocating movement of the poppet valve member 212 within the housing 200. In some embodiments, the poppet valve member 212 engages and then moves away from the valve seat 214 on the order of 100 times per hour.

The change in back pressure caused by repeated, reciprocal movement of the poppet valve member 212 engaging the valve seat 214 and temporarily interrupting flow through the housing 200 operates to break up any air bubbles or pockets within the fluid upstream of the housing 200. In this manner, the flow regulation valve 10 changes turbulence in a fluid flowing toward the valve 10.

One feature of the embodiment shown in FIGS. 5 and 6 compared to the previously discussed example is that the flow regulator 210 is not in line with the primary fluid flow through the housing 200. The branch 206 is situated at an oblique angle to a primary flow direction from the inlet to the outlet of the housing 200. When the poppet valve member 212 is away from the valve seat 214, the flow regulator 210 does not reduce or otherwise impact flow through the valve 10.

The illustrated example embodiment includes a spring abutment member 220 that is selectively moveable along the rod 216 to effectively change the biasing force the spring 218 applies to urge the poppet valve member 212 against the valve seat 214 and the amount the poppet valve member 212 moves in response to the pressure of fluid entering the housing 200. An adjustor 222 that is accessible from outside the housing 200 allows an individual to manually adjust the position of the spring abutment member 220 and compress or relax the spring 218. In some embodiments, the spring abutment member 220 has a threaded bore and the rod 216 includes threads along a corresponding portion of its length that receives and supports the spring abutment member 220. Support rods 224 prevent rotation of the spring abutment member 220 so that rotating the rod 216 using the adjustor 222 causes the spring abutment member 220 to move linearly along the rod 216.

The support rods 224 in this example have ends that are fixed to a mounting flange 226 that is connected to a mounting flange 228 at an end of the branch 206 of the housing 200.

The illustrated example embodiment includes a permeable guide sleeve 230 that is received in the branch 206. The guide sleeve 230 provides stability and guidance to the poppet valve member 212 within the branch 206. In the illustrated example, the guide sleeve 230 comprises a hollow, cylindrical metal screen. The permeable guide sleeve 230 allows fluid flow through the housing when the poppet valve member 212 is retracted and away from the valve seat 214.

Figure 7:
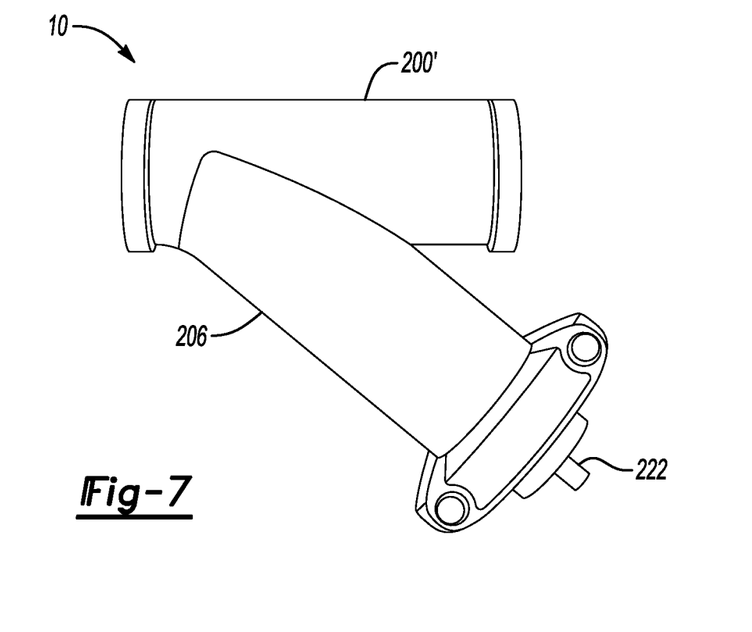
FIG. 7 shows another example configuration of a flow regulation valve.

FIG. 7 shows another valve 10 having features like those described above and shown in FIGS. 5 and 6. In this embodiment, the housing 200' has a different profile compared to that of the embodiment shown in FIGS. 5 and 6. This example valve 10 operates in the same manner as described above.

The illustrated example embodiments reduce a likelihood that a customer will be charged for more liquid than is actually received by the customer because entrained gas bubbles or pockets within the liquid will not be large enough to affect the reading of a meter that measures how much liquid is provided to or used by the customer. The reciprocating action of the flow regulator effectively breaks up and reduces the size of any such gas bubbles and the meter only detects or registers the liquid passing through the meter.

The above description is intended to be illustrative and not restrictive. Many embodiments and applications other than the examples provided may become apparent upon reading the above description. For example, additional embodiments are possible that include some features of one disclosed embodiment and some features of another disclosed embodiment.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A flow regulation valve, comprising:
   a housing including a valve seat within the housing, the housing defining a direction of fluid flow through the housing;
   a poppet valve disposed in the housing and oriented at an oblique angle relative to the direction of fluid flow, the poppet valve including a shaft, a crown and a spring that biases the crown into engagement with the valve seat, wherein the crown is received on and slidable along the shaft;
   an abutment surface situated to engage an end of the spring distal from the crown, wherein the abutment surface is moveable along a direction at the oblique angle relative to the direction of fluid flow, wherein the abutment surface is on a disk that is movable along the shaft; and
   an adjustor oriented at least partially along the oblique angle, wherein the adjustor is accessible from outside the housing for selectively setting a tension on the spring by moving the abutment surface relative to the crown and the shaft.

2. The flow regulation valve of claim 1, wherein
   the shaft of the poppet valve has an axis,
   the crown is situated near one end of the shaft,
   the spring is received around the shaft, and
   the abutment surface is moveable along a direction parallel to the shaft.

3. The flow regulation valve of claim 1, comprising a sleeve at least partially surrounding the poppet valve and oriented at the oblique angle, the abutment surface movable relative to the sleeve, the sleeve guiding movement of the abutment surface along a direction parallel to the oblique angle.

4. The flow regulation valve of claim 1, wherein
   the shaft is threaded,
   the disk has a central opening that is threaded, and
   the adjustor rotates the shaft to cause the disk to move relative to the shaft.

5. The flow regulation valve of claim 4, comprising at least one guide that engages the disk to prevent rotational movement of the disk and to allow longitudinal movement of the disk along the shaft.

6. The flow regulation valve of claim 5 wherein the at least one guide includes at least one support rod, wherein the at least one support rod is elongated in a direction parallel to the shaft, wherein the disk is slidably mounted on the at least one support rod to move linearly along the at least one support rod.

7. The flow regulation valve of claim 6 wherein the at least one support rod includes two support rods, each elongated in a direction parallel to the shaft, wherein the disk is slidably mounted on the two support rods to move linearly along the two support rods.

8. The flow regulation valve of claim 4 wherein the shaft extends through the crown, and wherein the shaft extends through the disk.

9. The flow regulation valve of claim 1, wherein the housing includes a first portion, a second portion oriented colinear with the first portion, and a third portion at an oblique angle to the second portion.

10. The flow regulation valve of claim 9, wherein the poppet valve and the abutment surface are situated in the third portion.

11. The flow regulation valve of claim 9, wherein:
    the first portion and the second portion define a direction of fluid flow through the housing, the valve seat is situated between the first portion and the second portion, the crown isolates the second portion from the first portion when the crown engages the valve seat, and the poppet valve does not reduce fluid flow through the first portion and the second portion when the crown is in a retracted position away from the valve seat.

12. The flow regulation valve of claim 1 wherein the shaft extends through the crown.

13. A flow regulation valve, comprising:
a housing including a valve seat within the housing, the housing defining a direction of fluid flow through the housing;
a poppet valve disposed in the housing and oriented at an oblique angle relative to the direction of fluid flow, the poppet valve including a shaft, a crown and a spring that biases the crown into engagement with the valve seat;
an abutment surface situated to engage an end of the spring distal from the crown, wherein the abutment surface is moveable along a direction at the oblique angle relative to the direction of fluid flow, wherein the abutment surface is on a disk that is movable along the shaft;
an adjustor oriented at least partially alone the oblique angle, wherein the adjustor is accessible from outside the housing for selectively setting a tension on the spring by moving the abutment surface relative to the crown and the shaft; and
a sleeve at least partially surrounding the popper valve and oriented at the oblique angle, the sleeve guiding movement of the abutment surface along the direction parallel to the oblique angle, wherein the sleeve guides movement of the crown along a direction parallel to the oblique angle.

14. A flow regulation valve, comprising:
a housing including a valve seat within the housing, the housing defining a direction of fluid flow through the housing;
a poppet valve disposed in the housing and oriented at an oblique angle relative to the direction of fluid flow, the poppet valve including a shaft, a crown and a spring that biases the crown into engagement with the valve seat;
an abutment surface situated to engage an end of the spring distal from the crown, wherein the abutment surface is moveable along a direction at the oblique angle relative to the direction of fluid flow, wherein the abutment surface is on a disk that is movable along the shaft;
an adjustor oriented at least partially alone the oblique angle, wherein the adjustor is accessible from outside the housing for selectively setting a tension on the spring by moving the abutment surface relative to the crown and the shaft; and
a sleeve at least partially surrounding the poppet valve and oriented at the oblique anble, the sleeve guiding movement of the abutment surface along the direction parallel to the oblique angle, wherein the sleeve is permeable and allows fluid flowing through the housing to flow through the sleeve.

15. A flow regulation valve, comprising:
a housing including a valve seat within the housing, the housing defining a direction of fluid flow through the housing;
a poppet valve disposed in the housing and oriented at an oblique angle relative to the direction of fluid flow, the poppet valve including a poppet valve member slidable along a rod that extends through the poppet valve member, the poppet valve further including a spring that biases the poppet valve member into engagement with the valve seat;
an abutment surface situated to engage an end of the spring distal from the poppet valve member; and
an adjustor oriented at least partially alone the oblique angle, wherein the adjustor is accessible from outside the housing for selectively setting a tension on the spring by moving the abutment surface relative to the poppet valve member and relative to the rod.

16. The flow regulation valve of claim 15 further comprising at least one support rod, wherein the abutment member is slidably mounted on the at least one support rod to prevent rotational movement of the abutment member and to allow longitudinal movement of abutment member along the rod.

17. The flow regulation valve of claim 15 wherein another end of the spring is proximal to the poppet valve member.

18. A flow regulation valve, comprising:
a housing including a valve seat within the housing, the housing defining a direction of fluid flow through the housing;
a poppet valve disposed in the housing and oriented at an oblique angle relative to the direction of fluid flow, the poppet valve including a poppet valve member and a spring that biases the poppet valve member into engagement with the valve seat;
an abutment member slidable along a rod and situated to engage an end of the spring distal from the poppet valve member;
an adjustor oriented at least partially alone the oblique angle, wherein the adjustor is accessible from outside the housing for selectively setting a tension on the spring by moving the abutment surface relative to the poppet valve member and relative to the rod, wherein rotation of the adjustor causes rotation of the rod; and
at least one support rod elongated in a direction parallel to the rod, wherein the abutment member is slidably mounted on the at least one support rod to prevent rotational movement of the abutment member and to allow longitudinal movement of abutment member along the rod.

19. The flow regulation valve of claim 18 wherein another end of the spring is proximal to the poppet valve member.

20. The flow reguolation of claim 18 wherein the rod is threaded, the abutment member has a central opening that is threaded, the rod threadably engages the central opening of the abutment member, and wherein rotation of the adjustor rotates the rod to cause the abutment member to move along the rod.

21. A flow regulation valve, comprising:
a housing including a valve seat within the housing, the housing defining a direction of fluid flow through the housing;
a poppet valve disposed in the housing and oriented at an oblique angle relative to the direction of fluid flow, the poppet valve including a poppet valve member and a spring that biases the poppet valve member into engagement with the valve seat;
an abutment member slidable along a rod and situated to engage an end of the spring distal from the poppet valve member; wherein the rod etendds through the poppet valve member; and
an adjustor oriented at least partially along the oblique angle, wherein the adjustor is accessible from outside the housing for selectively setting a tension on the spring by moving the abutment member relative to the poppet valve member and relative to the rod, wherein rotation of the adjustor causes rotation of the rod.

* * * * *